2,809,179

RUBBER BARYTES COMPOSITIONS AND METHODS OF PREPARATION

Herbert A. Endres, Silver Lake, and James W. Shaw, Jr., Akron, Ohio, and Harold B. Pullar, Magnolia, Ark., assignors, by mesne assignments, to The Goodyear Tire & Rubber Company, Akron, Ohio, a corporation of Ohio No Drawing. Application July 23, 1954,
Serial No. 445,446

11 Claims. (Cl. 260—41.5)

This invention relates to a rubber-like composition and is more particularly directed to a material comprising a rubber and a filler combined, and to a process for preparing the composition.

The rapid advance in highway transportation has brought about the need for more and better roads. Highway surfacing is of two general types, bituminous asphalt and concrete. This invention is concerned with improvements in the former.

Bituminous asphalt surfacing is normally susceptible to deterioration by the elements. For example, water invades the surfacing through sub-surface seepage or lateral infiltration and tends to break the bond between the asphalt and the aggregate because the water has a greater affinity for the aggregate than does the asphalt. Also, oxidation causes the asphalt to harden and thus start pitting and stripping. Because bitumens differ so much in physical and chemical properties, it is difficult to control the plasticity and ductility of the surfacing. All bitumens have the undesirable characteristic of being soft and sticky in hot weather and hard and brittle in cold weather. These and other objections to bituminous asphalt have been substantially alleviated by the practice of this invention whereby a readily dispersible rubber powder combined with a carrier is incorporated into the asphalt. A small amount of rubber is found to have a very marked effect by substantially reducing the temperature susceptibility of the asphalt as well as adding other desirable qualities to the pavement. The rubber thus compounded has a tendency to swell and absorb the lower boiling constituents of the hot asphalt. The road surface thus prepared is less susceptible to temperature changes which, in turn, decreases cracking during freezing weather and increases stability during hot weather. In this manner serious defects in asphalt paving have been alleviated.

It has been attempted previously to use rubber in road building. Thus, it is known that rubber block cushioning of road surfaces has many advantages, e. g., it not only gives more resiliency but also tends to increase substantially the life of the pavement. However, such rubber block pavements are impractical due to cost.

More recently it has been observed that a small percentage of rubber added to the customary asphalt pavement improves its properties. This addition has been accomplished by sifting vulcanized rubber particles into a hot asphalt aggregate composition while it is being mixed in a pug mill. It has also been attempted to add latex rubber for this purpose directly to hot asphalt or in an asphalt emulsion.

However, these methods of incorporating rubber in asphalt paving compositions are not satisfactory. The addition of the rubber in the form of latex is subject to the disadvantage that the composition must be mixed until all the water is driven off. Also, this process is objectionable because, due to the presence of water, the mixture of rubber latex and hot asphalt tends to foam. This prevents proper mixing and creates a handling problem. On the other hand, if the rubber is added in the form of vulcanized ground rubber particles, it is more or less free-flowing but, being vulcanized, resists penetration by the asphalt and, consequently, is only partially effective. Less highly vulcanized rubber particles are not free-flowing, tend to mass on storage, and are hard to handle. Unvulcanized rubber is open to the objection that it is difficult to process into the form of a powder. Also, it tends to coalesce and block during storage. Therefore, prior to this invention no completely satisfactory method of incorporating free-flowing raw rubber in an asphalt mix had been devised.

Since the cost of rubber, as compared to the cost of asphalt, prohibits a large percent of rubber from being used for road purposes, it is a prime consideration to prepare a composition which will be cheap enough to allow its use in road construction and which achieves the maximum benefit from the rubber component.

Such compositions, while described herein primarily for use in building roads, may also be employed in other connections.

The percentage of rubber used in road surfacing must not be very large. Since its effect is primarily physical, the distribution of the rubber in the asphalt must be as complete and uniform as possible in addition to being rapid. This means that the rubber powder must be finely divided and free-flowing, and must be stable and not form lumps or agglomerates on storage. One of the problems in connection with the use of rubber in asphalt has been the development of a practical method of manufacturing such a finely divided and free-flowing rubber powder.

It is, therefore, an object of this invention to provide a free-flowing rubber composition. It is another object of this invention to provide a composition of rubber and a filler-carrier which can be mixed directly with asphalt. Still another object of this invention is to produce a composition with particles of rubber and particles of filler closely united or associated. It is a further object of this invention to prepare a composition of rubber and filler in powdered form. An additional object of this invention is to provide a method of preparing a rubber composition by coprecipitating rubber from latex with a slurried filler in a liquid medium. Other objects will be apparent as the description proceeds.

In the practice of this invention a water suspension of a mineral composition containing barytes is combined with rubber latex and then co-precipitated by means of a coagulant. The precipitated compound is filtered, dried and pulverized. The product is inexpensive, easy to handle because it is free-flowing, and readily disperses in asphalt.

In most processes where a rubber additive is incorporated into asphalt, time is a very critical factor if the process is to be practical and economical. For example, the rubber should disperse in most customarily used asphalts in two minutes or less and often in a period as short as 30 seconds. This rapid dispersion can be effected only by means of specially prepared rubber powder, for example, powder which is loose and free-flowing.

The preferred carrier for the rubber is a natural mineral form of barium sulfate which is also known as barite and which contains from about 30 to about 97% or more pure barium sulfate together with natural impurities such as quartz and compounds of silica. Pure barium sulfate can be used in practicing the invention although the barium sulfate content of the mineral normally ranges from about 35% to about 55% by weight. This preferred material is in the nature of a sludge or effluent which is a by-product in the production of substantially pure barium sulfate from barite bearing ore. Because the barytes sludge is a solution of a natural mineral product, it is apparent that the composition will vary considerably. Pure barytes customarily has a hardness of 3 to 3½ on Mohs' scale and is usually mined in the form of large chunks which contain many impurities and which are broken up into small irregularly shaped lumps which are in turn slurried in water. Normally, the composition used in the practice of this invention will have a specific gravity less than pure barytes of commerce. The barytes composition will thus have a dry gravity of about 3.05 (30% BaSO$_4$) to about 4.5 (100% BaSO$_4$) with the dry gravity of the preferred composition ranging from about 3.25 to about 3.50.

The reasons why the materials of this invention so markedly modify the properties of asphalt are not completely ascertained. However, from a rheological standpoint, rubber must be highly dispersed in asphalt to have a maximum effectiveness. It is probable that a highly dispersible rubber proceeds to ultimate dispersion in three stages: (1) dispersion of the discrete rubber particle into the mass of asphalt; (2) the partial or complete breakdown of the rubber particle into molecular or near-molecular size, accompanied by effective "solution" in the asphalt; and (3) a structural rearrangement occurring between the asphalt micelle and the rubber molecule to form essentially a new material. If a rubber is not capable of phases 1 and 2, the rubber exists merely as sticky particles and gives property changes to the asphalt only as a physical admixture.

It is believed that the maximum effect can be accomplished only through rapid dispersion of the rubber particles. The use of a carrier for the rubber thus becomes imperative. Because the carrier must help disperse the rubber particles in the shortest amount of time in order to obtain complete dispersion before the rubber particles begin to swell, selection of the carrier is very important. The carrier should be one that is selectively wet by a hydrocarbon such as asphalt. This is particularly true when the composition is to be used in road surfacing or other uses where exposure to the atmosphere is necessary. When the carrier is preferentially wet with asphalt, it can serve as an aid to the rubber in preventing stripping of the surfacing composition from the base by the action of water.

It has been shown that the barytes composition of this invention has the unique quality of being preferentially wet by asphalt. This property helps the rubber prevent stripping of the composition from the base. In addition, it has been found that the barytes composition functions as a rapid dispersant for the rubber particles when combined in the form of the free-flowing powder of the invention, thus uniquely qualifying the barytes composition as a carrier for the rubber.

Several examples of the preferred carrier compositions are:

COMPOSITION 1

| | |
|---|---|
| BaSO$_4$ | percent 51 |
| SiO$_2$ | do 27 |
| Al$_2$O$_3$ | do 9 |
| Fe$_2$O$_3$ | do 2 |
| Combustible material | do 4.69 |
| Specific gravity | 3.35 |

COMPOSITION 2

| | Percent |
|---|---|
| Loss on ignition | 4.60 |
| Silica (SiO$_2$) | 29.60 |
| Barium sulfate (BaSO$_4$) | 54.90 |
| Alumina (Al$_2$O$_3$) | 4.70 |
| Iron (Fe$_2$O$_3$) | 2.47 |
| Magnesia (MgO) | 1.32 |
| Copper (Cu) | 0.01 |
| Manganese (Mn) | 0.15 |
| Zinc (Zn) | 0.16 |
| Phosphorus (P) | 0.04 |
| Titanium (TiO$_2$) | 0.25 |
| Calcium | present 0.21 |
| Sulfides (Potash) | do 0.49 |
| Carbon dioxide | do 1.32 |
| | 100.22 |

The estimated mineralogical analysis is as follows:

| | Percent |
|---|---|
| Barite, BaSO$_4$ | 54.9 |
| Illite, K$_2$O·2Al$_2$O$_3$·6SiO$_2$·2.25MgO·0.75FeO·2H$_2$O | 11.7 |
| Kaolinite, Al$_2$O$_3$·2SiO$_2$·2H$_2$O | 4.7 |
| Quartz, SiO$_2$ | 21.8 |
| Pyrite, FeS$_2$ | 1.2 |
| Gypsum, CaSO$_4$·2H$_2$O | 0.7 |
| | 95.0 |

COMPOSITION 3

| | Percent |
|---|---|
| Loss on ignition | 4.60 |
| Silica (SiO$_2$) | 29.60 |
| Barium sulfate (BaSO$_4$) | 54.90 |
| Alumina (Al$_2$O$_3$) | 4.70 |
| Iron (Fe$_2$O$_3$) | 2.47 |
| Magnesia (MgO) | 1.32 |
| Copper (Cu) | 0.01 |
| Manganese (Mn) | 0.15 |
| Zinc (Zn) | 0.16 |
| Phosphorus (P) | 0.04 |
| Titanium (TiO$_2$) | 0.25 |
| | 98.20 |

Calcium, Sulfides, Sodium, Carbon dioxide — Traces present

Thus it is readily apparent that mineral constituents of the impure barite composition can vary over a substantial range without affecting the unique ability of the composition to carry a rubber into an asphalt.

The mineral barytes or barite composition appears to be preferentially wetted by asphalts and oils which would in turn repel or replace water. These characteristics coupled with the relative softness of the material provides an extended surface which uniquely qualifies the barytes composition as a carrier for rubber which is to be incorporated into asphalts or oils because these qualities provide a free-flowing filler which disperses in the hydrocarbons very rapidly, sets the same and has an affinity therefor. Thus, the rubber can be intimately and homogeneously mixed with an asphaltic bitumen in a very rapid manner. Because the rubber is so completely and homogeneously distributed before it dissolves in the asphalt, a small amount of rubber is capable of imparting desired unique qualities to the asphalt.

In the practice of the invention, the barytes composition, in an amount of about 5 to 30 parts by weight, is slurried with about 95 to 70 parts by weight of water. The pH of the slurry is adjusted to about 7.0 to 9.5, by the addition of any customary commercial alkali, e. g. metallic alkalis such as sodium, potassium and lithium hydroxides, ammonium hydroxide, and salts which tend to form bases when ionized, such as sodium and potassium carbonates and bicarbonates, to prevent premature coagulation of the rubber-latex when the barytes composion and latex are combined. Many of the commercial latices have a pH which is high enough to maintain the slurry system within the indicated range without the addition of additional alkali.

The latex and slurried barytes effluent are combined after the pH of the slurried barytes has been adjusted. The mixture is then agitated until substantially homogeneous.

Based on dry weight of the materials, it has been found that about 10 to 30 percent by weight of rubber can be coagulated with about 90 to 70 percent by weight of the mineral barytes composition to obtain a free-flowing product.

The weight relationship of rubber to carrier or filler must be maintained with a predominance of carrier. This weight relationship, however, may provide a product which is substantially 50% rubber and 50% carrier by volume when the weight relationship is 30% rubber and 70% carrier. The density of pure barytes is about 4.5 to 4.6 and the densities of the various silicates generally associated with the barite mineral are usually about 2.6 and the density of preferred impure barytes-silicate combination is about 3.5. Because the specific gravity of the impure barytes composition is usually between 2.5 and 4.6 and the specific gravity of rubber is about 1, the volume relationship will always favor the rubber content whereas the weight relationship will favor the barytes-silicate composition.

Because of the factor of rapid dispersibility in asphalt, the particle size of the carrier is important. In order to obtain a free-flowing, rapidly dispersible product, no substantial portion of the particles of carrier should be more than about 50 microns, and a substantial portion should be less than 10 microns, in diameter. It is preferred that about 90% of the carrier particles be less than 10 microns in diameter. However, for certain purposes, the particle size may be larger than for other purposes, the critical factors being storage-stability and free-flowability.

It has been found that any type of rubber latex is operable in the practice of this invention. Natural rubber latices, butadiene-styrene latices, i. e., GR–S latices, polybutadiene latices, butadiene-acrylonitrile latices and polyisoprene latices are representative examples. Where the rubberized filler is to be incorporated into hot asphalt, it is desirable that the latex contain an antioxidant such as phenylbetanaphthylamine, mixtures of alkylated phenols, etc. It is preferred to use GR–S type latex containing about 26–28% by weight of rubber. These are latices of butadiene-styrene 70:30 copolymers. An equivalent amount of rubber solids from other latices of various rubber concentration may be used. Generally the rubber concentration should not exceed 70% by weight. It is preferred that the rubber contain a small amount of a commercial antioxidant. Such a rubber can be processed at a higher temperature than is possible with rubber which does not contain an antioxidant.

After the latex-filler slurry has been thoroughly mixed, coagulation can be effected by adding to the slurry of rubber latex and barytes composition the coagulant, i. e., aluminum sulfate, mixtures of aluminum sulfate and sodium chloride, magnesium sulfate, any mineral acid such as hydrochloric, nitric, sulfuric, etc., acetic acid, salts which will form acids upon ionization such as calcium, potassium, magnesium, and barium nitrates, sulfates and chlorides, and other electrolytes. The particle size of the rubber can be controlled by regulating the pH of the slurry, the concentration of the coagulant, degree of agitation, and the rate of addition thereof to the slurry. Finer particle size of rubber-filler can be obtained by maintaining vigorous agitation of the slurry during coagulation, by decreasing the concentration of the coagulating solution, by the choice of coagulant, by the use of additives such as sodium ligno sulphonate and sodium polyphosphates, and by decreasing the rate at which the coagulant is added to the slurry. The method of adding the coagulant and selection of the coagulant are important because the particle size can be partially controlled in this manner. For example, the composition should be agitated during the coagulation in order to make the composition more uniform and to disperse the coagulant. It has been found that aluminum sulfate provides the best coagulant and should be added in the concentration of about .05 to 5.0% by weight and preferably at a rate sufficient to maintain a concentration of about .10 to about .25% by weight, based on the total slurry including the coagulated material.

The temperature of the slurries at the time of coagulation or co-precipitation is, of course, significant. However, the temperature range can vary considerably depending on the coagulant used and the end use for the final product. The temperature can range from room temperature to high temperatures which would cause severe agglomeration. Normally, the temperature will range from 60° F. to 150° F. Customarily, room temperature co-precipitation is used in the practice of this invention.

The exact mechanism of the co-precipitation and the reason the co-precipitate of barytes composition and rubber is uniquely free-flowing and storage-stable and imparts unusual characteristics to asphalts and oils has not been completely and finally determined. However, inspection under an electron microscope leads to the belief that the rubber-mineral composition comes out of suspension in the form of a mass of particles wherein there are groups of mineral particles containing a discontinuous phase of rubber. It is believed that each mineral particle has an associated thin film of rubber within the pits which are contained in the irregular surface area of the particle and that an interlacing of thin films of rubber surrounds groups of barytes particles. Thereafter, when the composition is dried and pulverized, the rubber films are ruptured, allowing mineral particles, which contain a discontinuous rubber phase, to protrude through the films. In this manner a loose, free-flowing powder is provided which can be rapidly dispersed in an asphalt phase and which is in the form of small particles, 95% of which will pass through a 60-mesh standard sieve and a substantial portion of which will pass through a 100-mesh standard screen.

It has been discovered that particle size, distribution and rapid dispersion are very important elements in road surfacing because the mixing cycle may be as short as 1½ minutes and this requires rapid distribution coupled with maximum surface area in order to obtain substantially complete amalgamation with the asphalt constituents before spreading.

The final rubber-mineral product may contain from about 10 to 30 percent, or more, by weight of rubber and from about 90 to 70 percent, or less, by weight of mineral. In the practice of this invention we have found that a dry pulverized composition containing 20% by weight of rubber and 80% by weight of barytes composition gives very satisfactory results.

The dry rubber-filler composition can be mixed with dry powdered asphalt in an amount of about 40 to 60% by weight of rubber-filler composition to about 60 to 40% by weight of powdered asphalt. This material can be mixed in the usual manner with hot asphalt aggregate and a flux oil and used in the construction of road surfaces. The rubber-filler compound can be mixed directly with hot asphalt if desired, omitting the powdered asphalt. For certain purposes the powder can be used without being added to an asphalt.

In the practice of this invention, the rubber is so minutely dispersed and separated by the mineral particles that it readily amalgamates with asphalt by either heat or friction or both. The effect of the composition of this invention on the qualities of bituminous asphalt is to greatly increase the low temperature ductility, greatly raise the softening point, provide greater impact resistance, particularly at low temperatures, substantially increase the elasticity, increase the viscosity and pour point, decrease the stripping action of water, increase penetration at low temperatures, resist oxidation, improve resistance to bleeding, and thus reduce maintenance costs.

Perhaps the most important effect is the fact that there is a marked decrease in the degree of property variations of asphalt with changes in temperature. When unmodified asphalt is subjected to high atmospheric temperatures the low molecular weight oils are lost due to evaporation. They can also be lost by migration into the aggregate. This deleteriously changes the composition of the asphalt. In the presence of rubber, these oils become a part of the rubber gel structure and the tendency for loss through volatilization is greatly decreased. Liquid plasticizers are markedly affected by temperature variations. They become very active at elevated temperatures, and inactive at low temperatures. Unmodified asphalt whiche contains low molecular weight plasticizing oils become brittle at low temperatures and soft to the point of stickiness at high temperatures. Binding these oils into the rubber gel makes them a part of a highly elastic solid, thus tying up the constituents which cause the asphalt to be so sensitive to temperature changes.

Although the invention has been described with respect to road building compositions, it is to be understood that it can be used for any purpose where asphalt is normally used. Representative examples of such uses for the product of this invention are in the production of roofing paints, roofing papers, under-coatings for autos and trucks, bonding materials for irrigation ditches, asphalt siding, shingles, floor tile, joint fillers for concrete roads and in erosion control. Also, the products of this invention are useful without being added to asphalt, e. g., as additives to oil-base drilling fluids, as additives to calking compounds and in the water-proofing of fabrics.

The following representative examples are for the purpose of illustrating the invention and are not intended as limitations thereof.

Example 1

A mineral barytes composition which can be termed a composition of barite effluent fines was obtained in the form of a water slurry which was the waste by-product effluent obtained in the purification of the crude mineral. This composition contained about 55% barium sulfate as well as portions of silicon dioxide, aluminum oxide, iron oxide, magnesium oxide and traces of copper, manganese, zinc and phosphorus. The pH of the slurry was adjusted from 4.5 to about 9 with sodium hydroxide. This was necessary to prevent coagulation of the latex to be mixed therewith before blending the two liquids. About 510 pounds of GR-S rubber, containing the antioxidant phenylbetanaphthylamine, in the form of a 30% by weight rubber latex was added to about 4000 pounds of the barytes composition (in slurry form) and the slurried mixture was agitated to assure thorough blending. To the slurried rubber-carrier suspension about 2 pounds of aluminum sulfate were added in the form of a ½% by weight water solution. This caused coagulation of the rubber which came down with particles of mineral adhered to the particles of rubber.

The composition was next passed through a filter press and blown with air for about 30 minutes. This reduced the water content of the cake down to about 25 to 30%. The filtered cake was extruded through a small rod-forming extruder and the resultant rods were dried in tray driers to less than 0.5% moisture. This was accomplished by drying for 4 hours at a temperature of 190° F. The dry rods were next pulverized to less than 35-mesh by means of a pulverizer to give a final product composed of 11.3% rubber and 88.7% mineral.

The dry free-flowing powder was mixed with powdered asphalt to provide a road-building component comprising 47% powdered asphalt, 47% barytes and 6% rubber. This product was used as a building material in the preparation and installation of a hot asphalt road test strip. The powder was free-flowing, easily handled, and low cost, a definite advance in the art of road building.

Although the composition of the foregoing example was prepared on a batch basis, it will be apparent that a continuous production process is practical. Also it will be understood that the particle size of the rubber can be controlled by adjusting the conditions under which coagulation is effected as hereinabove set forth.

Example 2

A rubber-barytes composition containing the following ingredients was prepared as in the above example:

Grams
Natural rubber latex (30% by weight of rubber)__ 185
Barytes in 1,000 ml. of water_____ 391

The latex and barytes were mixed together and coagulated by means of 20 grams of sodium chloride and 5 grams of aluminum sulphate. The rubber with barytes attached coagulated very readily and gave a small particle size on drying. The final pulverized product was capable of passing through a 35-mesh standard screen and was free-flowing.

Example 3

A rubber-barytes composition was prepared by means of a continuous pilot-plant process.

Unvulcanized 76:24 butadiene-styrene latex was employed as the rubber component. The filler used was a waste barytes effluent containing 54% barium sulfate, the particle size being such that the particles would all pass through a 200-mesh sieve and a large part would pass through a 325-mesh sieve. The barytes was present in the form of a 15% aqueous slurry and the rubber latex had a rubber solids content of 25%. The two components were mixed together in a suitable vessel so as to give a solids proportion of from 20 to 25% of rubber and from 75 to 80% by weight of barytes. This mixture was coagulated by employing a 2% solution of alum so as to provide from about 1.5 to 2% of alum by weight of rubber. The prceipitated rubber-barytes was then filtered on a rotary drum filter under partial vacuum resulting in a cake having about 40% moisture. This semi-dry material was then mixed with some of the finished free-flowing powder to form a dough having less than 20% moisture content. This material was then dried in a conventional Raymond flash-drying apparatus. The resulting product was free-flowing and storage-stable and substantially capable of passing through a 40-mesh sieve, about 70 to 80% being capable of passing through a 100-mesh sieve.

Although this invention finds its greatest adaptation in the field of hot mix bituminous asphalts, it is also adaptable to production of cold mixes. These mixes are particularly desired for patching and light surfacing. In addition, the products of the invention are useful without being added to asphalt, e. g. the powder may be added to drilling muds, calking compounds, fabrics, etc.

In this specification and the appended claims the term "latex rubber" as used therein is intended to include natural rubber "rubbery" latices, butadiene-styrene latices, e. g., GR-S latices, polybutadiene latices, butadiene-acrylonitrile latices and polyisoprene latices. Also, the term "barytes composition" as used herein means the natural mineral barite containing from 30% to 97% barium sulfate.

This application is a continuation-in-part of our co-pending application, Serial No. 248,886, filed September 28, 1951.

While certain representatives embodiments and details have been shown for the purpose of illustrating the invention, it will be apparent to those skilled in this art that various changes and modifications may be made therein without departing from the spirit or scope of the invention.

We claim:

1. The process of preparing a powdery, free-flowing rubber-mineral composition consisting essentially of the steps of (1) adjusting the water content of a mineral barytes composition containing at least 40% by weight of barium sulfate until a slurry of about 25–75% by weight barytes composition-water is formed, said mineral particles ranging in size from about 5 microns in diameter to about 50 microns in diameter, 90% of which are less than 10 microns in diameter, (2) adjusting the pH of said slurry to about 8.5 by adding sodium hydroxide thereto, (3) mixing the slurried mineral with a rubber latex, said latex being in the form of about a 30–70% by weight rubber-serum relation and being present in said mixture in the proportion of about 20% by weight of rubber and about 80% by weight of barytes composition, (4) co-precipitating the rubber and barytes composition by adding aluminum sulfate solution to individually coat the barytes particles with films of rubber, (5) filtering the co-precipitated mixture until only about 33% by weight of water remains, and (6) drying and pulverizing the rubber-barytes composition until only about 0.5% by weight of water remains and about 95% of said composition is capable of passing through a 100-mesh standard screen and to rupture said films of rubber to cause surface areas of said barytes particles to protrude through the films, and recovering composite particles composed of barytes and associated discontinuous rubber particles, as the product of the process.

2. The process of preparing a powdery, free-flowing rubber-mineral composition consisting essentially of the steps of (1) adjusting the water content of a mineral composition containing at least 40% by weight of barium sulfate and at least 25% by weight of a silicon composition until a slurry of about 25–75% by weight mineral composition-water is formed, (2) adjusting the pH of said slurry to about 8.5 by adding sodium hydroxide thereto, (3) mixing the slurried mineral with a rubber latex, said latex being in the form of about a 30–70% by weight rubber-serum relation and being present in said mixture in the proportion of about 20% by weight of rubber and about 80% by weight of mineral composition, (4) co-precipitating the rubber and mineral composition by adding aluminum sulfate solution to individually coat the barytes particles with films of rubber, (5) filtering the co-precipitated mixture until only about 33% by weight of water remains, and (6) drying and pulverizing the rubber-mineral composition until only about 0.5% by weight of water remains and to rupture said films of rubber to cause surface areas of said barytes particles to protrude through the films, and recovering composite particles composed of barytes and associated discontinuous rubber particles, as the product of the process and until about 95% of said composition is capable of passing through a 60-mesh standard screen.

3. The process of preparing a powdery, free-flowing rubber-mineral composition consisting essentially of the steps of (1) adjusting the water content of a mineral barytes composition containing at least 30% by weight of barium sulfate until a slurry of about 25–75% by weight barytes composition-water is formed, said mineral particles ranging in size from about 5 microns in diameter to about 50 microns in diameter, 90% of which are less than 10 microns in diameter, (2) maintaining the pH of said slurry above 7.0, (3) mixing the slurried mineral with a rubber latex, said latex being in the form of about a 30–70% by weight rubber-serum relation and being present in said mixture in the proportion of about 25% by weight of rubber and about 75% by weight of barytes composition, (4) co-precipitating the rubber and barytes composition to individually coat the barytes particles with films of rubber by adding aluminum sulfate soltuion, (5) filtering the co-precipitated mixture until only about 33% by weight of water remains, and (6) drying and pulverizing the rubber-barytes composition to rupture said films of rubber to cause surface areas of said barytes particles to protrude through the films, and recovering composite particles composed of barytes and associated discontinuous rubber particles, as the product of the process, and until only about 0.5% by weight of water remains and about 95% of said composition is capable of passing through a 60-mesh standard screen.

4. The process of preparing a powdery, free-flowing composition comprising the steps of (1) adjusting the water content of a mineral barytes composition containing at least 30% by weight of barium sulfate until a slurry of about 25–75% by weight barytes composition-water is formed, said mineral particles ranging in size from about 5 microns in diameter to about 50 microns in diameter, 90% of which are less than 10 microns in diameter, (2) maintaining the pH of said slurry above 7.0, (3) mixing the slurried mineral barytes with a rubber latex, said rubber being present in said mixture in the proportion of about 5 to about 30% by weight of rubber to about 95 to 70% by weight of mineral barytes, (4) co-precipitating the rubber and mineral barytes by adding a coagulant to individually coat the barytes particles with films of rubber, (5) filtering the co-precipitated rubber-barytes mixture in order to remove a substantial portion of the water, and (6) drying and pulverizing the rubber-barytes mixture in order to effect complete drying and in order to rupture said films of rubber to cause surface areas of said barytes particles to protrude through the films, and recovering finely divided composite particles composed of barytes and associated discontinuous rubber particles, as the product of the process.

5. The process of preparing a powdery, free flowing rubber-mineral composition comprising the steps of (1) adjusting the water content of a barytes composition containing at least 30% by weight of barium sulfate until a slurry of about 25–75% by weight barytes composition-water is formed, said mineral particles ranging in size from about 5 microns in diameter to about 50 microns in diameter, 90% of which are less than 10 microns in diameter, (2) maintaining the pH of said slurry above 7.0, (3) mixing the slurried barytes composition with a rubber latex, said rubber being present in said mixture in the proportion of about 5 to 30% by weight of rubber to about 95 to 70% by weight of barytes composition, (4) co-precipitating the rubber and barytes composition by adding a coagulant to individually coat the barytes particles with films of rubber, and (5) drying and pulverizing the co-precipitated mixture in order to rupture said films of rubber to cause surface areas of said barytes particles to protrude through the films, and recovering composite particles composed of barytes and associated discontinuous rubber particles, as the product of the process and provide a composition wherein at least 95% will pass through a 60-mesh standard screen.

6. The process of preparing a powdery, free-flowing rubber-mineral composition comprising the steps of (1) mixing a slurried bartyes composition containing at least 30% by weight of barium sulfate and having a pH of about 7.0 to 9.5 with a rubber latex in the proportion of about 10% by weight of rubber to 90% by weight of mineral to about 30% by weight of rubber to about 70% by weight of mineral, (2) co-precipitating the rubber and mineral barytes by adding a coagulant to the slurried mixture in order to precipitate the mineral and coagulate the rubber simultaneously to individually coat the barytes particles with films of rubber, (3) drying the co-precipitated mixture of rubber-barytes composition and (4) pulverizing the dried agglomerates to rupture said films of rubber to cause surface areas of said barytes particles to protrude through the films, and recovering composite particles composed of barytes and associated discontinuous rubber particles, as the product of the process and so that the individual particles will pass through a 60-mesh screen.

7. A free-flowing, powdery rubber-barytes composition which can be readily dispersed in bituminous asphalt consisting essentially of about 20% by weight of rubber and about 80% by weight of barytes composition, said composition being composed of particles of barytes of irregular surface area interlaced with adherent discontinuous films of unvulcanized rubber latex.

8. A free-flowing, powdery rubber-barytes composition which can be readily dispersed in bituminous asphalt consisting essentially of about 5 to 30% by weight of rubber and about 95 to 70% by weight of barytes composition, said composition being composed of particles of barytes of irregular surface area interlaced with adherent discontinuous films of unvulcanized rubber latex.

9. A free-flowing, powdery rubber-barytes composition which can be readily dispersed in bituminous asphalt comprising about 5 to 30% by weight of rubber and about 95 to 70% by weight of mineral barytes, said composition being composed of particles of barytes of irregular surface area interlaced with adherent discontinuous films of unvulcanized rubber latex, 95% of which will pass through a 60-mesh standard screen.

10. A storage-stable, free-flowing powder capable of passing through a 60-mesh standard screen consisting essentially of from about 10% by weight to about 50% by weight of an unvulcanized rubber and from about 90% by weight to about 50% by weight of a finely divided mineral barytes, said powder being composed of particles of barytes of irregular surface area interlaced with adherent discontinuous films of unvulcanized rubber latex.

11. A method of preparing a storage-stable, free-flowing powder capable of readily dispersing in asphalt and capable of passing through a 60-mesh standard screen, containing from about 10% to about 50% by weight of unvulcanized rubber and from about 90% to about 50% by weight of a finely divided mineral barytes, consisting essentially of the simultaneous coagulation of said unvulcanized rubber from a latex and removal of said mineral from a water slurry to individually coat the barytes particles with films of rubber; and drying said coagulated rubber and mineral to rupture said films of rubber to cause surface areas of said barytes particles to protrude through the films, and recovering composite particles composed of barytes and associated discontinuous rubber particles, as the product of the process.

References Cited in the file of this patent

UNITED STATES PATENTS

| Re. 21,572 | Ott | Sept. 17, 1940 |
| 2,700,655 | Endres et al. | Jan. 25, 1955 |

OTHER REFERENCES

McMahon et al.: Ind. Eng. Chem., 36, 735–738 (1944).